Dec. 22, 1970  S. R. F. MILLER  3,548,541
SUPPORTING AND MANIPULATING EQUIPMENT
FOR SHOT BLASTING APPARATUS
Filed July 10, 1967  11 Sheets-Sheet 2
—FIG.2.—
—FIG.3.—
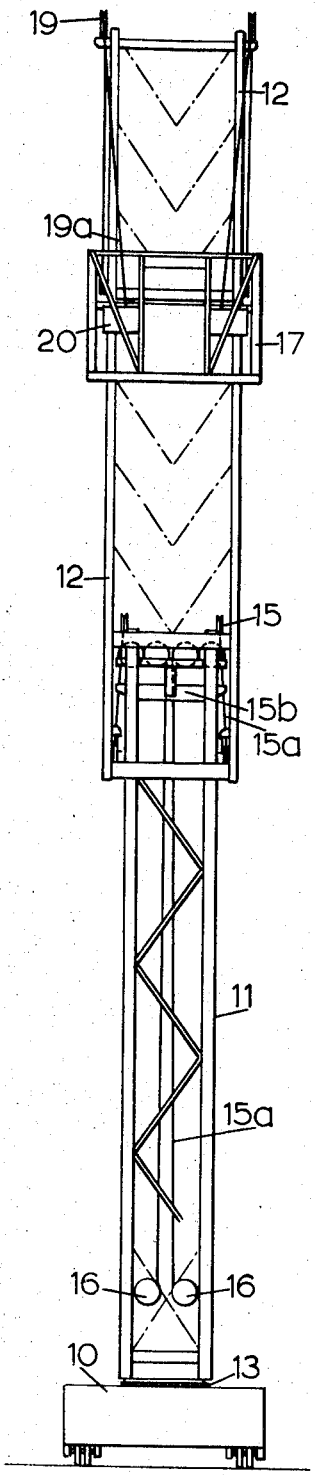
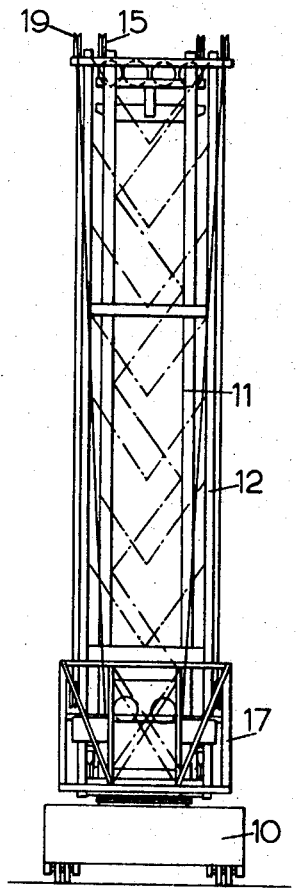
INVENTOR:
SAMUEL R. F. MILLER
BY
*Imirie & Smiley*
ATTYS.

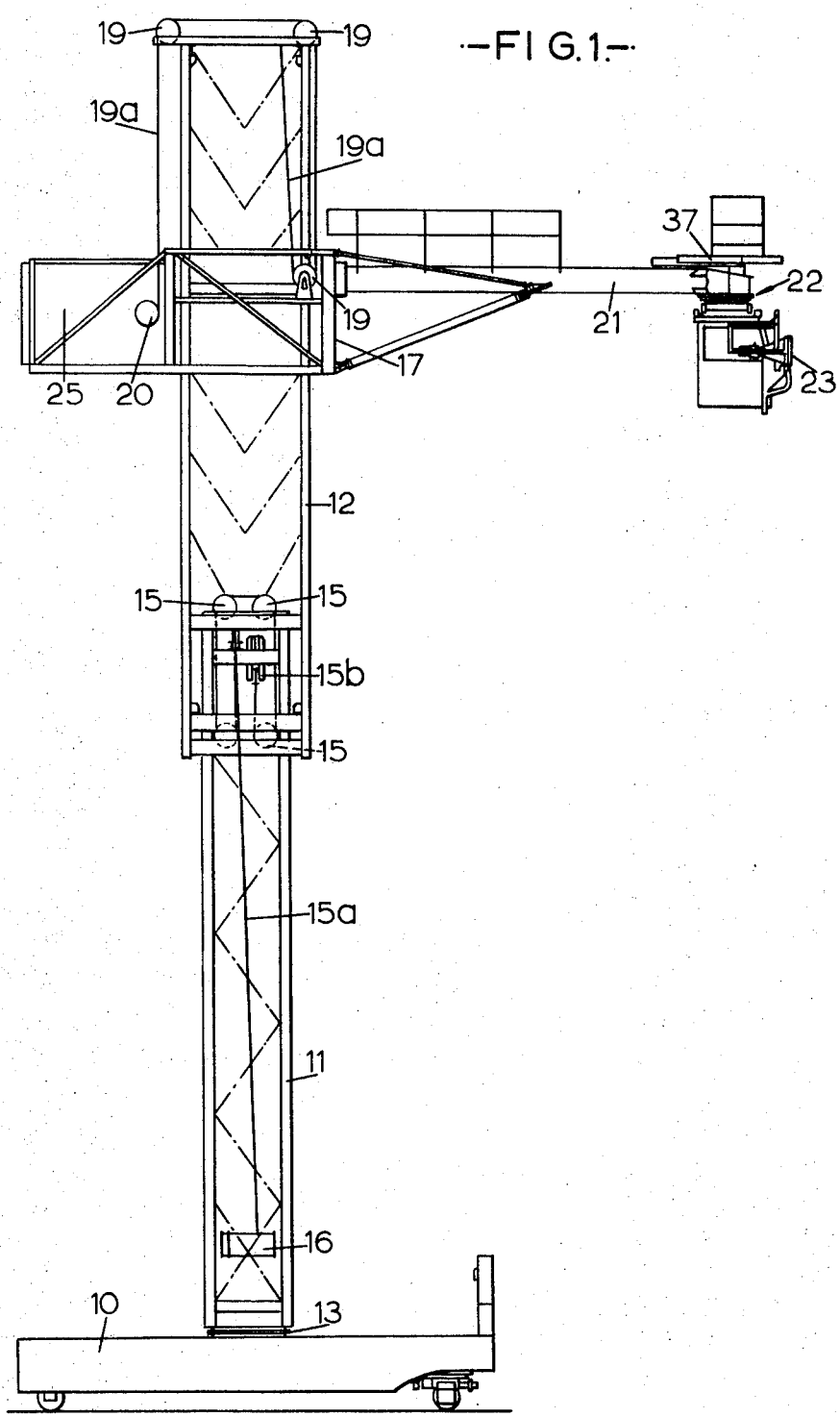

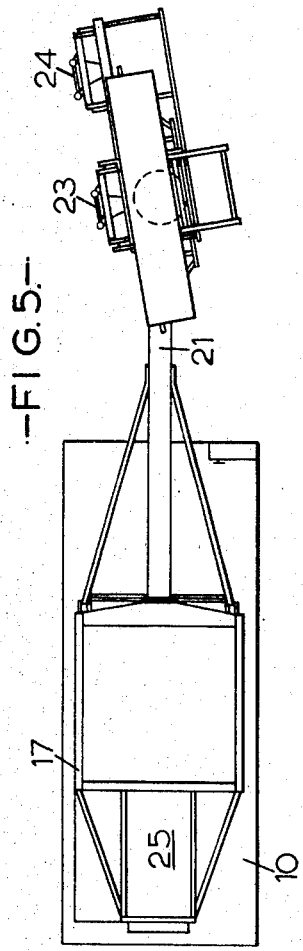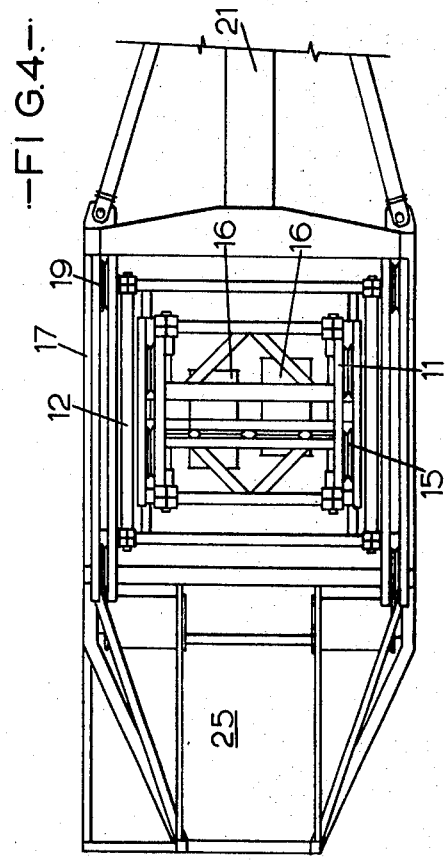

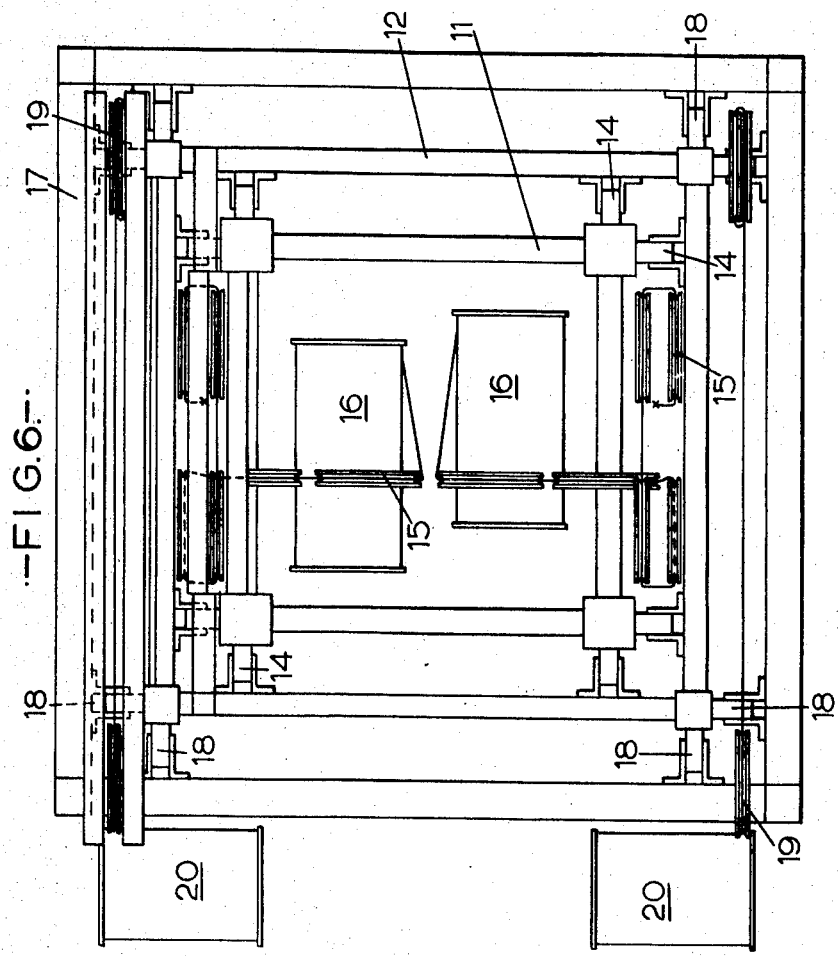

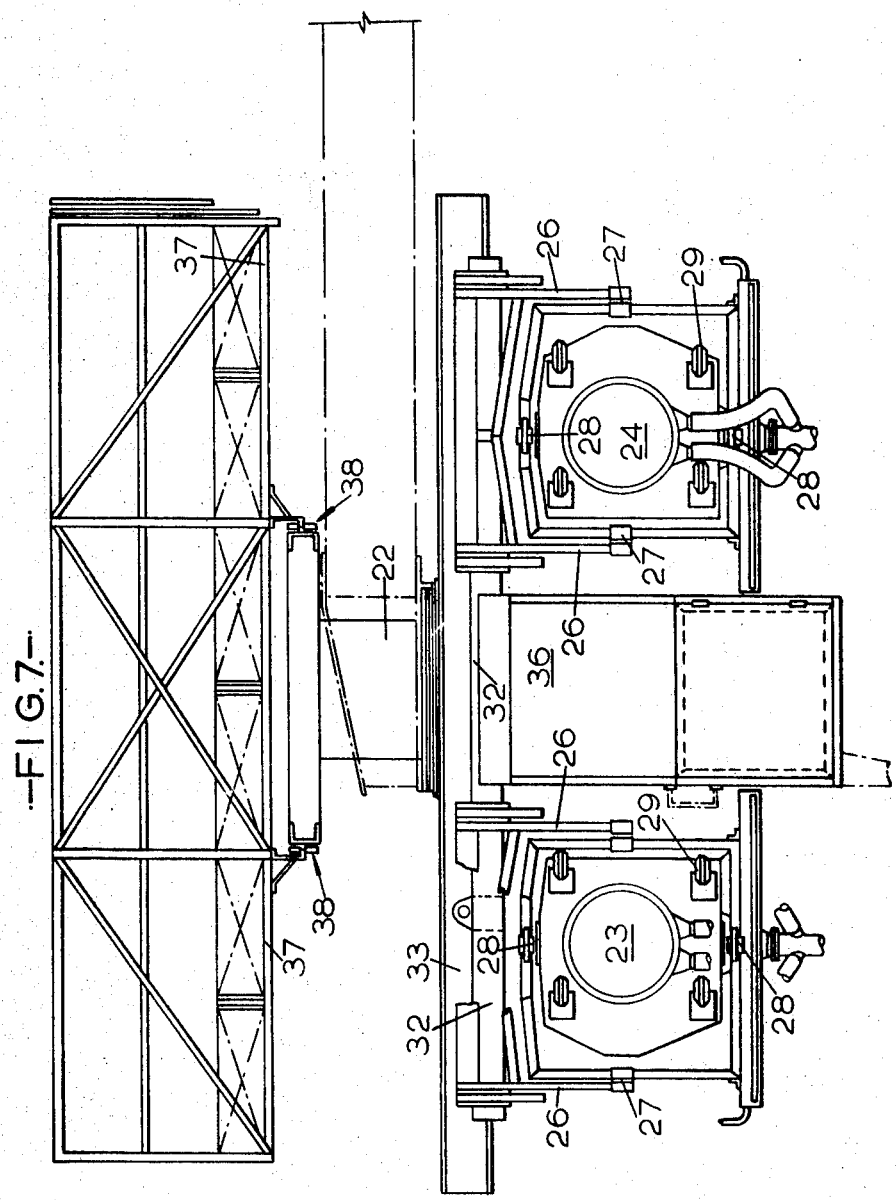

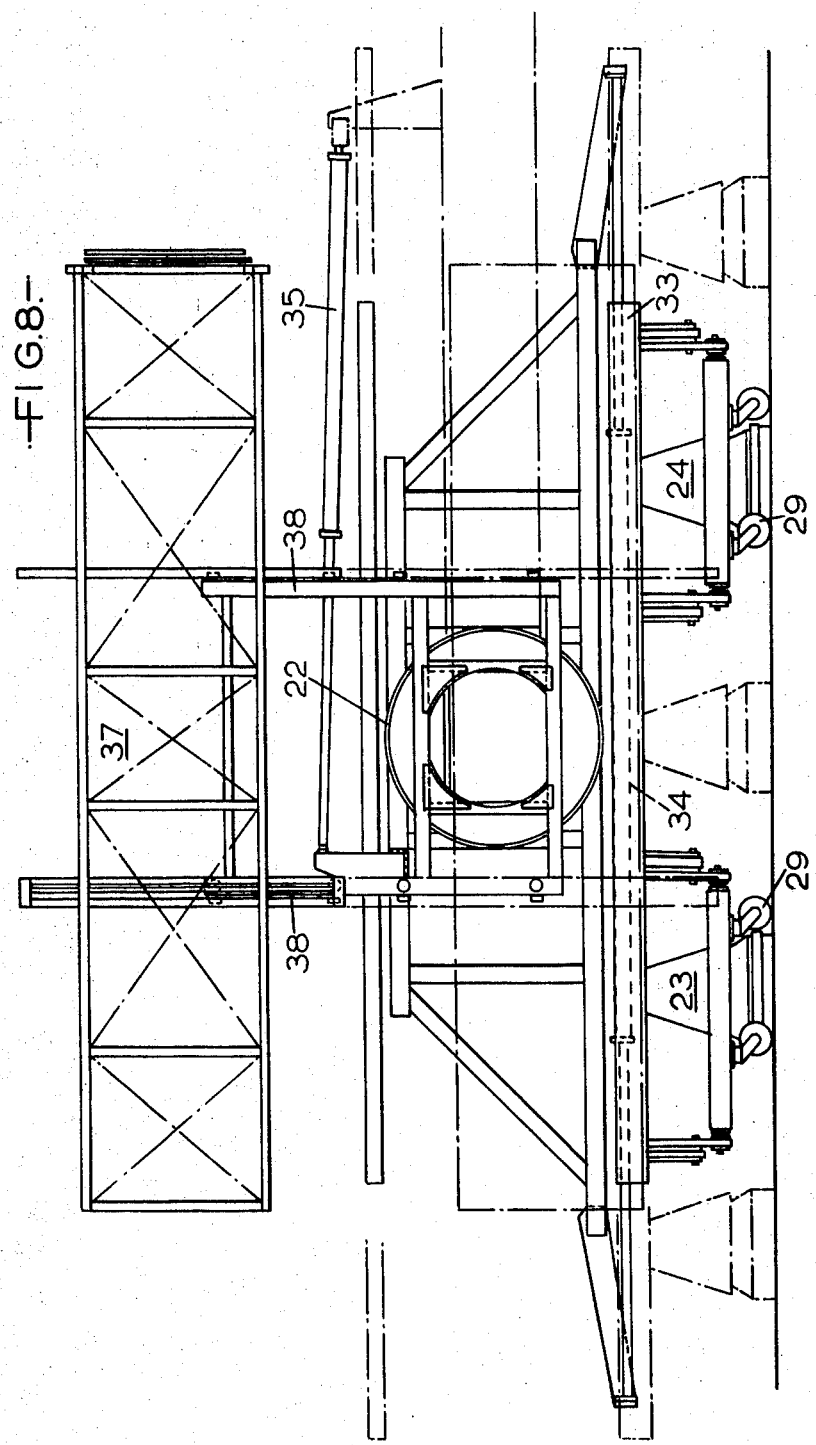

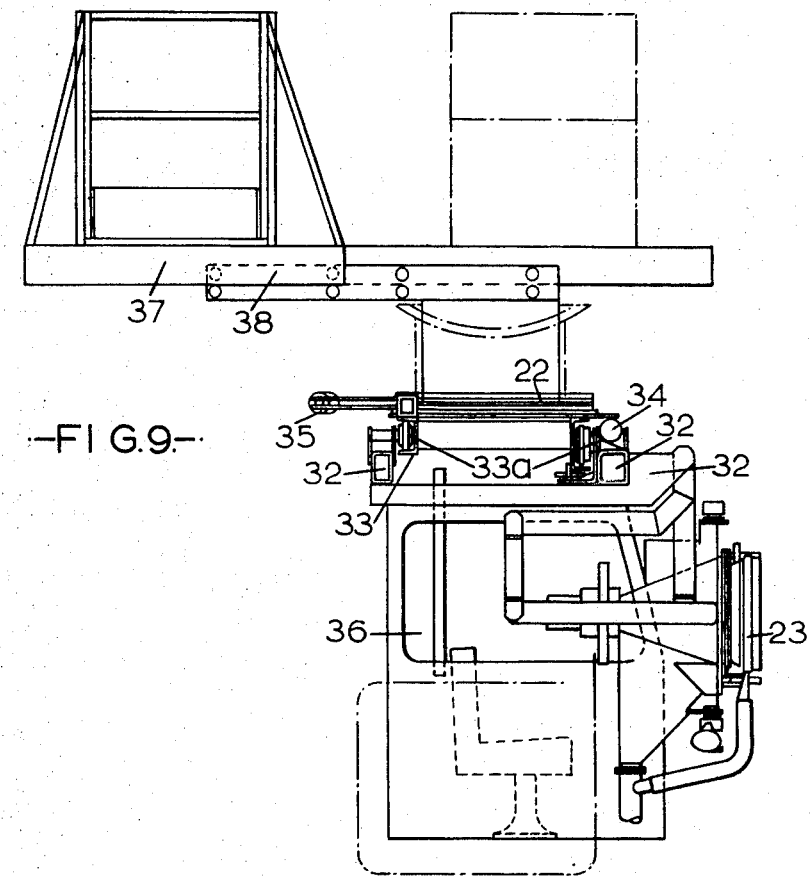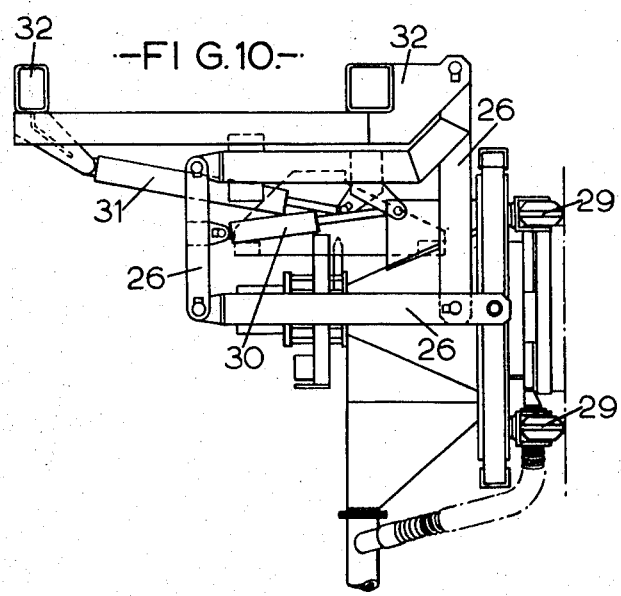

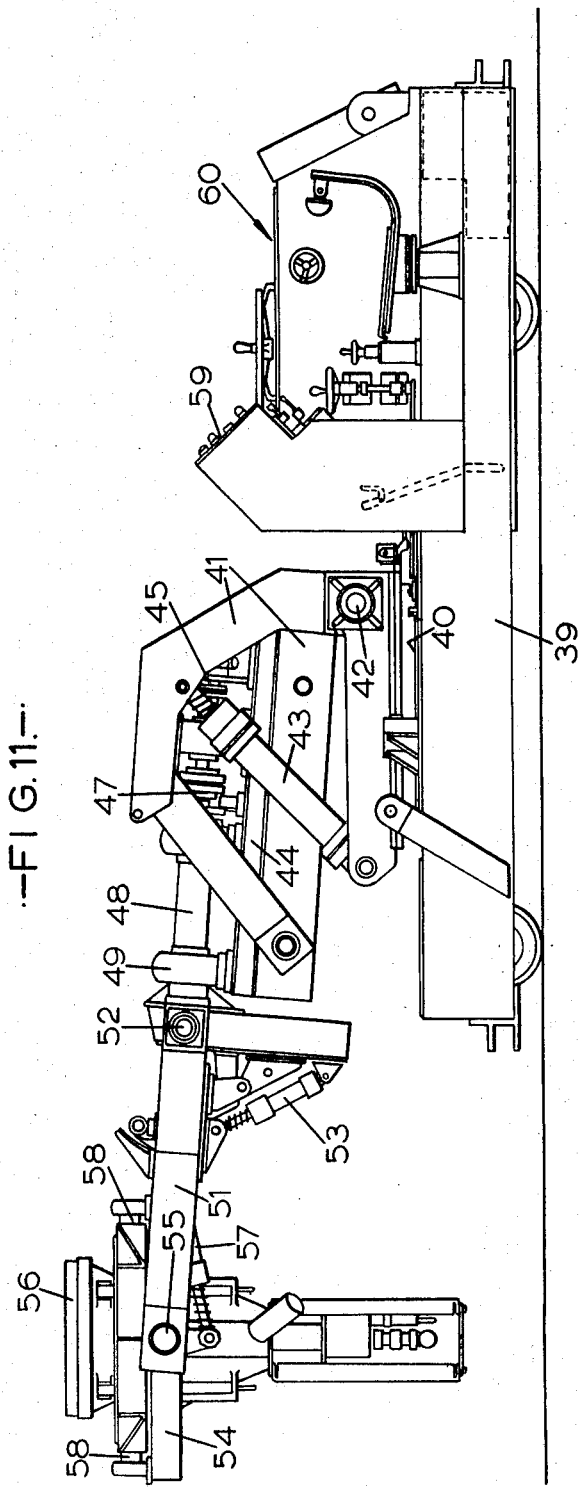

Dec. 22, 1970  S. R. F. MILLER  3,548,541
SUPPORTING AND MANIPULATING EQUIPMENT
FOR SHOT BLASTING APPARATUS
Filed July 10, 1967  11 Sheets-Sheet 9
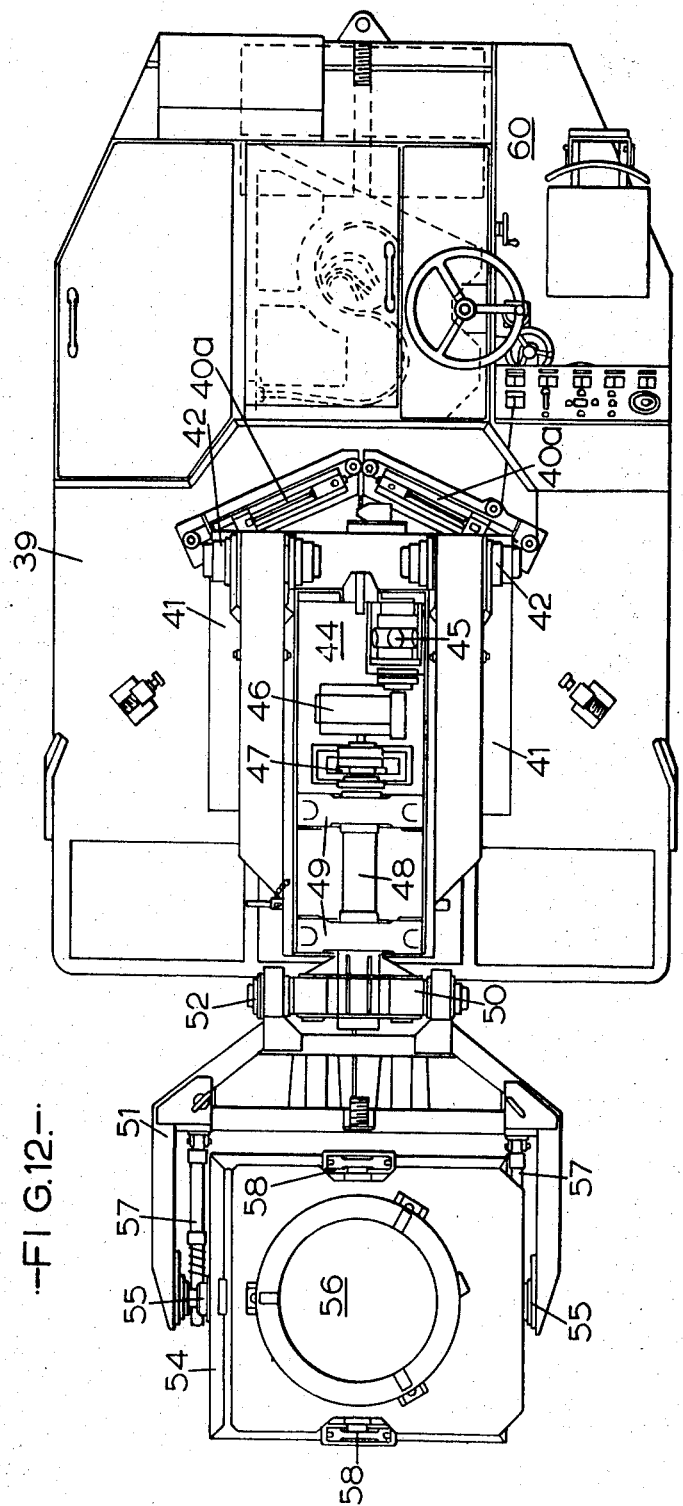
-FIG.12.-
INVENTOR:
SAMUEL R. F. MILLER
BY
Smicie & Smiley
Attys.

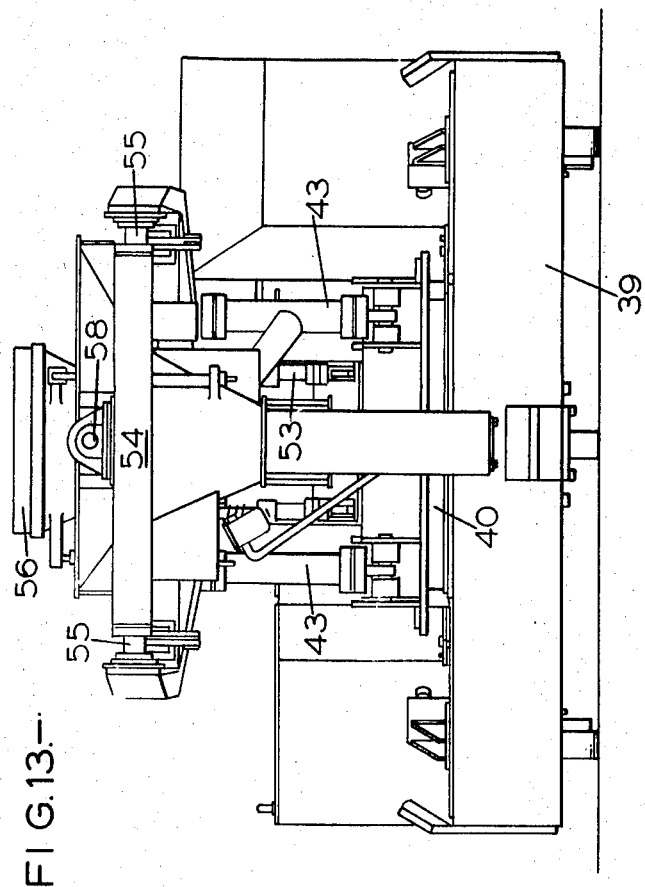

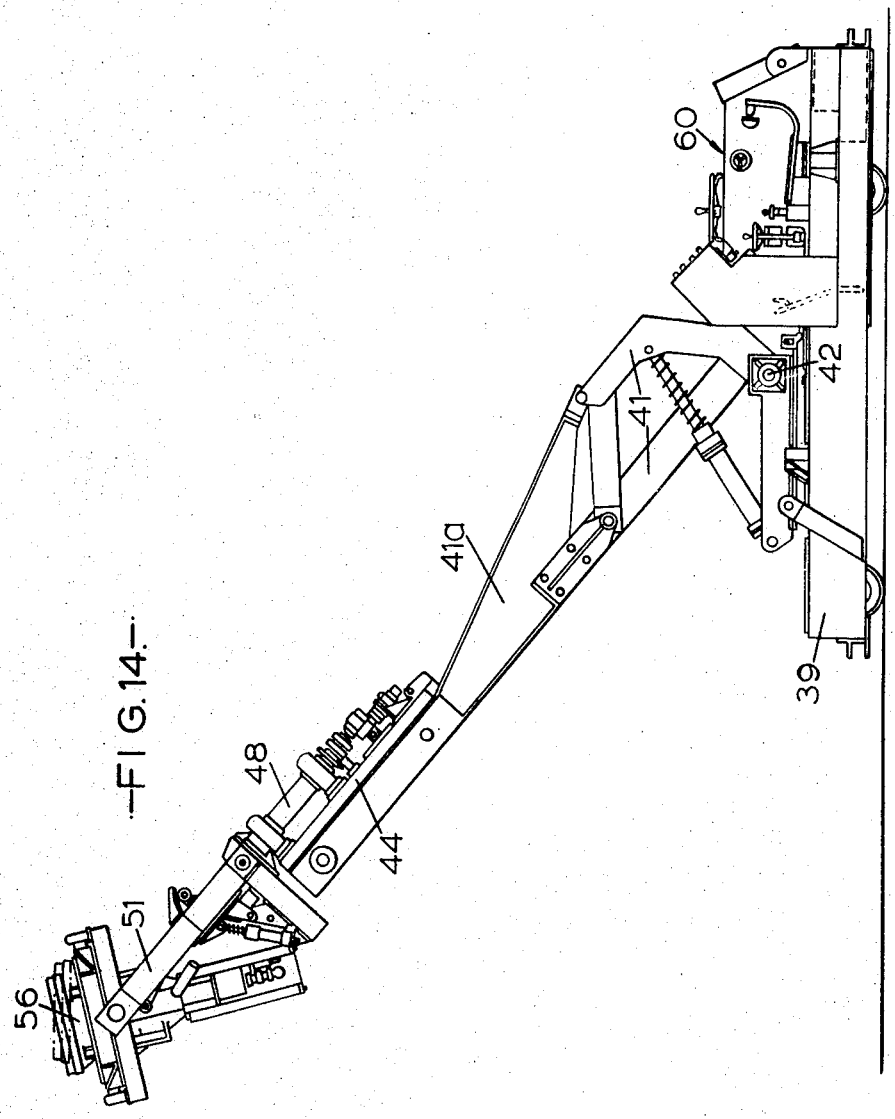

United States Patent Office 3,548,541
Patented Dec. 22, 1970

3,548,541
SUPPORTING AND MANIPULATING EQUIPMENT
FOR SHOT BLASTING APPARATUS
Samuel R. F. Miller, Heswall, England, assignor to
Cammell Laird (Shiprepairers) Limited, Monk Ferry
Brow, Birkenhead, England, a British company
Filed July 10, 1967, Ser. No. 651,201
Claims priority, application Great Britain, July 16, 1966,
32,081/66; Nov. 25, 1966, 52,880/66
Int. Cl. B24c 3/06
U.S. Cl. 51—8
21 Claims

ABSTRACT OF THE DISCLOSURE

Equipment for supporting and manipulating shot or grit blasting, painting, cleaning and like apparatus, comprises a mobile carriage, an adjustable tower or jib mounted on said carriage, articulated means mounting said shot blasting or like apparatus on the tower or jib so that the apparatus can adapt itself to a curved or irregular surface (e.g. the exterior of the hull of a ship) to be treated when moved thereover by adjustment of the tower or jib, and means for urging the shot blasting or like apparatus against such a surface. The tower or jib may be mounted on a turntable or slewing ring on the mobile carriage. In one form of the equipment the tower is a telescopic tower whereas in another form the jib has mounted on it a forwardly projecting trunnion shaft on which the articulated mounting means for the shot blasting or like apparatus is supported.

---

This invention is for improvements in or relating to supporting and manipulating equipment for shot or grit blasting, painting, cleaning and like apparatus hereinafter referred to collectively as "shot blasting apparatus."

One particular application of the invention which is, however, only mentioned by way of example, is to the cleaning by shot blasting and the subsequent painting of the exterior of the hull of a ship whilst in dry dock, one object of the invention being to decrease considerably the time and labour involved in cleaning the hull of a ship and subsequently carrying out the painting thereof.

According to the present invention there is provided equipment comprising a mobile carriage, an adjustable tower or jib mounted on said carriage, means mounting or for mounting shot blasting apparatus on the tower or jib so that said apparatus can adapt itself to a curved or irregular surface to be treated when moved thereover by adjustment of the tower or jib and means for urging the shot blasting apparatus against such a surface.

Embodiments of the invention will now be described, by way of example, with reference to the accompanying semi-diagrammatic drawings in which:

FIG. 1 is a side elevation of equipment, when fully extended, for use in the shot or grit blasting of a ship's side and the subsequent painting thereof in places other than those areas where the angle formed by a ship's side with the vertical exceeds 45°, FIG. 2 is a rear elevation of the tower equipment shown in FIG. 1, FIG. 3 is a further rear elevation but showing the tower equipment fully retracted when not in use or, when more convenient, for movement from one position to another, FIG. 4 is a plan view of the tower equipment shown in FIGS. 1 and 2, FIG. 5 is a plan view of a collar, arm and blasting unit or head forming part of the equipment shown in FIG. 1 but with the blasting head turned to an angle of approximately 90°, FIG. 6 is a further and more detailed plan view to a larger scale of the tower equipment shown in FIGS. 1 and 2, FIGS. 7 to 10 are detail views of the blasting guns, the mounting and operating means therefor and associated equipment, FIG. 11 is a side elevation of another form of equipment according to the invention designed for cleaning by shot or grit blasting the bottom of a ship's hull and at least a substantial area of the hull adjacent to the counter of the stern and elsewhere where the angle formed by the ship's side with the vertical is below 60°, i.e. the areas in which the equipment shown in FIGS. 1 to 10 cannot conveniently operate, FIG. 12 is a plan view of the equipment shown in FIG. 11, FIG. 13 is a front elevation of the equipment shown in FIGS. 11 and 12, and FIG. 14 is a view similar to FIG. 11 but showing a modification and with the blasting head in an elevated position.

Referring first to the embodiment of the invention shown in FIGS. 1 to 10 of the drawings, the equipment comprises a telescopic tower which is mounted on a self-propelled chassis 10. The tower is in two sections 11 and 12, the lower section 11 being the inner section. The section 11 is fixed to a turntable 13 on the chassis and the outer section 12 runs vertically over the inner section on guide rollers 14 (see FIG. 6) at two levels. The outer section is raised by a system of pulleys 15 and wire ropes 15a, duplicated on opposite sides of the tower, the ropes being connected to hydraulic winches 16 located on and within the section 11. The free ends of the two ropes 15a are connected to opposite ends of an equalising beam 15b pivoted at its centre to the upper part of the tower section 11. Should there be unequal extension in the ropes, then the beam 15b will deflect by pivoting about its centre, thus ensuring equal loading in the ropes.

A collar or rectangular frame 17 is fitted onto the tower section 12 and runs up and down the outside thereof on rollers 18 (see FIG. 6). The collar 17 is hoisted and lowered by a duplicate system of pulleys 19, ropes 19a and hydraulic winches 20, the latter being located on and at the back of the collar 17.

A horizontal arm 21 is rigidly fixed to the front of the collar 17. This arm is, say, approximately 30 feet long and is provided with a horizontally mounted turntable or slewing ring 22 at its extremity on which there is mounted the shot blasting apparatus which includes two shot blasting guns 23 and 24 (say 8 feet apart horizontally) and mechanisms, hereinafter described, for manipulating said guns.

The shot blasting apparatus may be of any suitable and convenient form but conveniently is of the form described in British patent specification No. 38,595/65 filed on Sept. 9, 1965 in the name of Vacu-Blast Ltd. This shot blasting apparatus is designed not only to seal against a ship's hull or the like and carry out the shot blasting operation but also to recover the shot and debris removed by the shot blasting operation which is most important in the cleaning by shot blasting of a ship's hull.

The compressed air and vacuum pumps and ancillary equipment for the shot blasting apparatus is mounted on the carriage or platform 10 and connected to the shot blasting heads 23 and 24 by means of flexible pipes, not shown.

The horizontal arm 21 is counterbalanced by detachable counter-weights 25.

Each gun (see FIGS. 7 to 10) is mounted on an independent system of levers or links 26 and gimbals 27 and 28 so that it can be advanced and retracted with respect to a ship's side, rotated and tilted up and down. The gimbal movement should be of the order of at least 5° up or down and 5° right and left. The gimbal gun mountings are fitted with castors 29, which may be spring-loaded, so that when the whole assembly is loaded against the ship's hull it can move freely over platejoints and minor projections both horizontally and vertically. The castors 29 are arranged so that the sealing means which surrounds the blasting gun, so as to provide a seal therebetween and the ship's side, as described in the above-mentioned British specification No. 38,595/65, will operate efficiently.

Each gun is provided with a hydraulic setting or thrust ram 30 (see FIG. 10) so that the gun assembly can be pushed out to make contact with the hull of the ship. The movement is such that the gun can be advanced a distance of 12 inches from its rearward position. Once the gun has made contact with the hull a constant pressure of, say, 300 lbs. per gun is automatically maintained on the ship's side by the setting or thrust rams. Normally the guns will operate with the rams in the mid-way position so that differences of plus or minus 6 inches in the configuration of the hull can be taken up by the rams.

Each gun assembly is able to tilt so that the guns can follow the profile of the hull of the vessel. This movement is effected by extending a hydraulic tilting ram 31 with which each gun is provided. The parallel lever or link arrangement 26 is such that the gun axle is able to move or tilt 45° above the horizontal and 5° below.

The whole gun assembly is mounted on a frame 32 which runs in a slide 33 on rollers 33a so that by actuating a double-acting ram 34 the frame and guns can be moved horizontally along a ship's hull backwards and forwards a distance of, say 8 feet to give a combined sweep of about 16 feet.

The top of the slide 33 is bolted to the horizontally mounted turntable unit 22, the upper part of which is secured on the underside of the horizontal arm 21 attached to the collar 17.

When not in use the turntable unit, together with the blasting equipment, is rotated anti-clockwise in a horizontal plane so that it is parallel to the arm 21. From this position it is able to rotate clockwise through an angle of 80° and anti-clockwise through an angle of 10°, these movements being effected by a hydraulic actuating device or head slewing ram 35.

In addition to carrying the two guns 23 and 24 the turntable unit may carry two heating ducts mounted below the guns and capable of being tilted and moved sideways with the guns.

An operator's cabin 36 is located between the two gun assemblies and is traversed with the guns. From this cabin the operator has good vision of the action of the guns.

A painter's platform 37, say 16 feet long, is mounted above the guns. This platform is retractable, on runners 38, so that it does not interfere with the tilting movement of the guns or foul the side of the ship when the hull overhangs the turntable unit. A screen is provided between the painter's position and the guns to prevent paint falling on the guns.

A console for control equipment is mounted in the cabin 36.

Operation of the equipment may be as follows:

The shot blasting tower 10, 11, 12, 17 is lowered into the dry dock by a crane and connected up to the power supply and shot blasting and recovery unit.

The trolley 10 is moved into position under its own power and trimmed for level by operating four hydraulic jacks with which it is provided. The jacks may be automatically self-levelling.

The operator and painter mount the tower and take over control of the equipment.

The tower is extended so that the guns 23 and 24 are level with the highest point of the area to be cleaned. The guns are then offered up to the ship's side by rotating the tower 11, 12 and slewing ring 22 in opposite directions. After contact has been made by both guns at the requisite angle of tilt, the tower turntable 13 and slewing ring 22 are locked in position.

The pressure in the thrust rams 30 is then applied so that the guns 23 and 24 are kept in contact with the ship's side at the preset pressure.

The guns and the ram 34 operating the gun traversing means are then started. The ram 34 is capable of working at speeds varying from, say, 5 feet per minute to 32 feet per minute.

As soon as the gun carrying frame 32 has moved to the end of its slide 33 it pauses for a sufficient period to allow the guns to drop, say, 12 inches by lowering of the collar 17 or the tower section 12 or both, after which the ram 34 will move the frame or crosshead 32 and guns 23 and 24 along the hull in the opposite direction.

For example, the frame or crosshead 32 may make an electric contact at the end of its stroke which will automatically cause operation of the hydraulic system so as to lower the guns and associated equipment by a predetermined amount before the movement of the ram 34 is reversed. With such an arrangement the guns traverse the hull vertically in steps. The arrangement may be modified, however, so that the guns are moved downwardly and laterally simultaneously.

During the lowering operation the following movements may take place:

(A) Lowering of the equipment in variable steps of, say from 3½ inches to 11½ inches, when the guns reach the ends of the slide 33, or (B) Continuous lowering of the equipment, at speeds varying between, say, 4 inches and 12 inches per minute, during operation and traversing of the guns so that the guns sweep or move downwardly and laterally over the hull simultaneously.

(C) Lowering or raising of the equipment, when clear of the ship's side, from top to bottom, at a minimum rate of, say, 16 to 17 feet per minute.

With regard to the control of operations of the equipment the following controls are provided in the cabin 36 for:

(a) Raising and lowering of the tower section 12 and collar 17 in steps or continuously.

(b) Rotation of the equipment on the slewing ring or turntable 22.

(c) Rotation of the tower on the turntable 13.

(d) Altering the tilt of the guns 23 and 24 by the rams 31.

(e) Operations of the setting or thrust rams 30 controlling the individual movement of the guns.

(f) Movement or reciprocation of the traversing frame 32, carrying the guns, along the slide 33 by the ram 34.

(g) Operation, by remote control, of valve means controlling the delivery of shot to the guns.

Movements (a) (lowering only), (e) and (f) may be controlled automatically, as well as manually.

Movements (a), (b) and (c) may also be controlled from a console on the trolley 10. There should then be a positive interlock system so that the controls on the trolley 10 cannot be moved when the operator has taken up his position at the control console in the cabin 36.

It is desirable that it should be possible to retract either gun separately so that when cleaning awkward areas one gun only need be used. When this operation is being carried out the stroke of the gun along the slide 33 may be variable by manual control.

Each setting ram 30 may be provided with a calibrated dial on the control console so that the operator can tell at a glance the position of each gun. When the position of either gun is such that it is within one inch of its maximum travel either towards or away from the hull, then a warning light or other alarm on the relevant dial may be caused to operate. As soon as a gun reaches its forward limit and is about to leave the hull of the ship, an electric contact device may cut off the hydraulic power and supply of shot to the guns. When a gun reaches the limit of rearward travel a similar contact device may cut off the hydraulic power thus preventing slewing of the head, traversing of the guns or slewing of the tower towards the ship.

A canopy or the like may be provided for the protection of operatives mounted on the platform 37. Conveniently this canopy comprises L-shaped brackets or arms adapted to be attached to the ship's rail on the inside or outside thereof so as to project outwardly, preferably horizontally, or at a slight angle from the rail. A back stay is provided from the brackets to, say, a part of a ship's deck and a further stay or guy rope may extend from the outer extremity of the brackets to the dock wall. Suitable tensioning devices will be provided in these stays or guys. Cross-members extend between the L-shaped brackets so as to carry the canopy proper which is lashed or otherwise secured to these members. Preferably the canopy has a flap or down-turned part at its forward end so as to direct rain or the like away from the operatives working under the canopy.

The embodiment of the invention shown in FIGS. 11 to 14 comprises a mobile self-propelled carriage 39. A slewing ring or turntable 40 is mounted on the carriage, angular movement of said slewing ring being effected by hydraulic rams 40a or a hydraulic motor. Arms 41, forming a jib, are pivotally mounted at 42 on the slewing ring, raising and lowering of said arms being effected by hydraulic rams 43. Thus, the arms 41 can be slewed with the slewing ring 40 about a vertical axis and raised and lowered in a vertical plane.

A baseplate 44 is carried by the arms 41. Mounted on the baseplate 44 is a hydraulic motor 45 which, through gearing in a gear box 46 and coupling 47, drives a heavy trunnion shaft 48 journalled in bearings 49 on the baseplate. A bracket 50 is attached to the forward end of the trunnion shaft 48. Thus, by operation of the motor 45 the bracket 50 can be rotated. Preferably rotation of the bracket is of the order of 60° either side of a vertical plane.

A yoke 51 is pivotally attached to the bracket 50 at 52 so that the yoke can be tilted locally, about the pivot 52, by means of a hydraulic setting ram 53 (see FIG. 11) without having to use the main arm luffing ram 43.

A gimbal 54 is pivotally supported within the yoke 51 at 55 and carries the shot blasting gun 56. Thus, the gun can tilt backwardly and forwardly about the pivots 55. This tilting motion is controlled by hydraulic rams 57 on the yoke 51. The gun 56 is mounted on the gimbal at 58 so that it can tilt (say, plus or minus 5° sideways freely within the gimbal frame.

The thrust required on the gun seal to keep the gun in contact with the ship's hull is conveniently of the order of 300 lbs. The movement of the setting ram 53 which applies the thrust is such that the gun can be raised, say, 12 inches. During operation the setting ram will normally operate in the half-way position so that it can move plus or minus six inches automatically according to local undulations in the ship's hull. In order that it can do this the pressure on the ram will be kept constant and a dial is provided in the operator's control console 59 to indicate the gun position. When the gun is within one inch of the limit of its plus or minus six inch travel a warning light flickers on the dial. When the gun reaches its upward limit (plus 6 inches) the supply of shot to the gun is cut off. When the gun is in the fully retracted position the power to the travel and slewing motions is cut off.

Operation of the equipment shown in FIGS. 11 to 14 may be as follows:

The trolley will be lined up to the hull of the ship and the arm 41 raised so that the gun 56 is in contact with the bottom of the ship with the setting ram 53 in the mid-position and the yoke 51 and gimbal 54 rotated so that the face of the gun is coincident with the plates of the ship. The gun will then be slewed horizontally to one side through an angle of about 40°. The gun 56 will then be started and the arm slewing mechanism set in motion so that the gun will move sideways over the bottom of the ship to form an arc, say 8 feet long, at a predetermined speed of between 5 and 32 feet per minute. Simultaneously the carriage 39 will be driven forwardly at a steady speed ranging from 4 inches to 20 inches per minute.

The movement of the arm will be automatically controlled so that after sweeping an 8-foot arc from left to right at a predetermined speed it will automatically reverse the motion and move over the plates from right to left. This automatic motion may be overridden by a manual control in awkward places.

For compactness and easy control the unit as shown in FIGS. 11, 12 and 13 has a relatively short arm 41 which limits the height to which the gun can be operated to, say, 8 feet above the level of the dock floor. When required to clean the turn of the bilge, which may extend to well above 8 feet from the dock floor, the baseplate 44 is temporarily removed and the arm 41 extended by a member 41a as shown in FIG. 14. The baseplate 44 is then bolted onto this arm extension member.

For cleaning the rounded part of the bilge a possible procedure is to offer up the gun to the ship's side and hold it there. The carriage 39 then moves forward at a rate of, say, 5 to 16 feet per minute so that a 6-inch to 12-inch band is cleaned at a constant height along the ship's side. The gun is then lowered and the carriage 39 traversed so as to clean another band just below the previous one. It is contemplated that the maximum angle of tilt of the gun required when cleaning the bilge will be about 16°.

All the motions above described are controlled by the operator in the cab 60.

I claim:

1. Equipment comprising a mobile carriage, an adjustable means mounted on said carriage, articulated mounting means mounting shot blasting apparatus on said adjustable means whereby said shot blasting apparatus can adapt itself to any surface to be treated when moved thereover by adjustment of the adjustable means, and means for urging the shot blasting apparatus against such surface, the improvement residing in that the adjustable means includes raising and lowering means whereby the apparatus can be raised and lowered and turntable means on the carriage whereby the apparatus can be swung in an arc transversely of the direction of movement of the carriage.

2. Equipment as claimed in claim 1 wherein the adjustable means is a telescopic tower mounted on a turntable on the mobile carriage.

3. Equipment as claimed in claim 1 wherein the raising and lowering means include a hinged jib having mounted on it a forwardly projecting trunnion shaft on which the mounting means for the shot blasting apparatus is supported.

4. Equipment as claimed in claim 3 and further comprising means for extending said jib.

5. Equipment as claimed in claim 2 wherein adjustment of the height of the telescopic tower is effected by a system of pulleys and ropes duplicated on opposite sides of the tower and connected to winch means, the free ends of the ropes being connected to opposite ends of a pivotally supported equalising beam which acts to ensure substantially equal loading in the duplicated ropes.

6. Equipment as claimed in claim 1 wherein the adjustable means is a telescopic tower and a collar-like frame is mounted on said tower and means is provided for raising and lowering said collar-like frame on the tower, the collar-like frame having a laterally projecting arm which carries the articulated mounting means for the shot blasting equipment.

7. Equipment as claimed in claim 6 wherein a horizontally mounted turntable is provided on said laterally projecting arm, said turntable having on it the articulated mounting means for the shot blasting apparatus.

8. Equipment as claimed in claim 1 and having at least two pieces of shot blasting apparatus supported by articulated mounting means from the adjustable means.

9. Equipment as claimed in claim 1 wherein the mounting means for the shot blasting apparatus includes a system of levers and a gimbal whereby said shot blasting apparatus can be advanced and retracted with respect to the surface to be treated and rotated and tilted.

10. Equipment as claimed in claim 9 wherein said system of levers comprises a parallel linkage arrangement.

11. Equipment as claimed in claim 1 wherein the mounting means for the shot blasting apparatus is provided with castors so that when the shot blasting apparatus is urged against the surface to be treated it can be traversed freely over joints or minor projections thereon.

12. Equipment as claimed in claim 11 wherein said castors are spring-loaded.

13. Equipment as claimed in claim 1 wherein the means for urging the shot blasting apparatus against the surface to be treated comprises at least one pressure-fluid ram.

14. Equipment as claimed in claim 1 wherein the articulated mounting means for the shot blasting apparatus has pressure-fluid ram means for actuating it to tilt said apparatus.

15. Equipment as claimed in claim 1 wherein the mounting means for the shot blasting apparatus runs in guides and pressure-fluid ram means is provided for reciprocating the mounting means in said guides whereby the shot blasting apparatus is traversed over the surface to be treated.

16. Equipment as claimed in claim 15 wherein the guide means is mounted on a horizontal turntable.

17. Equipment as claimed in claim 1 wherein an operator's cabin is carried by the adjustable means so as to be moved thereby with the shot blasting apparatus.

18. Equipment as claimed in claim 1 wherein a platform is carried from the adjustable means so as to be movable thereby with the shot blasting apparatus and is positioned so as to be above or below said shot blasting apparatus.

19. Equipment as claimed in claim 18 wherein said platform is mounted so that it can be retracted with respect to the surface to be treated.

20. Equipment as claimed in claim 1 and having means for locking the shot blasting apparatus at a requisite angle in relation to the surface to be treated.

21. Equipment comprising a mobile carriage movable in a longitudinal horizontal direction, an adjustable means mounted on the carriage, articulated mounting means mounting shot blasting apparatus on said adjustable means, the articulated mounting means having a limited amount of articulation about two orthogonal axes whereby the apparatus can adapt itself to minor changes of a surface to be treated when moved thereover by the adjustable means, and means for urging the apparatus against the surface, the adjustable means having power means for moving the shot blasting apparatus vertically, power means for moving the apparatus horizontally transversely of said longitudinal direction, power means for tilting the articulated mounting means about orthogonal axes so that when the apparatus is approached to the surface it can present itself to the surface in such a way that the apparatus will seat on the surface with the articulated mounting means operative to allow slight movement of the apparatus.

References Cited

UNITED STATES PATENTS

| | | | |
|---|---|---|---|
| 2,729,918 | 1/1956 | Van Denburgh | 51—8 |
| 3,015,913 | 1/1962 | Anderson | 51—9 |
| 3,149,438 | 9/1964 | Morley et al. | 51—8 |
| 3,262,228 | 7/1966 | Schenck | 51—9 |
| 3,396,492 | 8/1968 | Schenck | 51—8 |

LESTER M. SWINGLE, Primary Examiner